United States Patent [19]

Alexander

[11] Patent Number: 5,393,191

[45] Date of Patent: Feb. 28, 1995

[54] VEHICLE ATTACHMENT FOR TRANSPORTING SNOWMOBILES

[76] Inventor: Gordon O. Alexander, Box 252, Shawville, Canada, J0X 2Y0

[21] Appl. No.: 105,638

[22] Filed: Aug. 13, 1993

[51] Int. Cl.⁶ .............................................. B60P 1/43
[52] U.S. Cl. .................. 414/537; 414/477; 414/480
[58] Field of Search ............ 414/471, 477–480, 414/482–485, 532, 537

[56] References Cited

U.S. PATENT DOCUMENTS

| | | | |
|---|---|---|---|
| 3,536,214 | 10/1970 | Song | 414/537 |
| 3,604,579 | 9/1971 | Jenkins | 414/482 |
| 3,757,972 | 9/1973 | Martin | 414/537 |
| 3,945,521 | 3/1976 | Decker | 414/483 |
| 4,014,444 | 3/1977 | Jakel | 414/537 |
| 4,109,809 | 8/1978 | Clark | 414/480 |
| 4,470,746 | 9/1984 | Delachapelle | 414/470 |

FOREIGN PATENT DOCUMENTS

| | | | |
|---|---|---|---|
| 911378 | 10/1972 | Canada . | |
| 926438 | 5/1973 | Canada . | |
| 2648768 | 12/1990 | France | 414/477 |
| 0114031 | 4/1990 | Japan | 414/480 |
| 0262436 | 10/1990 | Japan | 414/532 |
| 3016837 | 1/1991 | Japan | 414/477 |

*Primary Examiner*—Frank E. Werner
*Assistant Examiner*—James W. Keenan
*Attorney, Agent, or Firm*—Norris M. Eades

[57] ABSTRACT

A snowmobile transporting device for mounting in a pick-up truck has a lower support frame adapted to be mounted in the load compartment of a pick-up truck and an upper support frame mounted on the lower support frame and adapted for longitudinal backward and forward movement on the lower frame. A snowmobile carrying platform is pivotally mounted on the upper support frame and this pivotal mounting includes a central pivot connecting the platform to the upper support frame, a circular track formed of a square tubular member fixed to the bottom of the platform and a plurality of lower rollers mounted on the upper support frame and engaging the circular track. A detachable ramp is provided for connecting to either a front end or a rear end of the platform, whereby the upper support frame and platform can be moved forward and backward while mounted in a truck and the platform can also be rotated relative to the upper support frame such that a snowmobile can be both loaded and unloaded by way of the ramp without moving in reverse.

3 Claims, 5 Drawing Sheets

VEHICLE ATTACHMENT FOR TRANSPORTING SNOWMOBILES

BACKGROUND OF THE INVENTION

This invention relates to a vehicle attachment for transporting snowmobiles and, more particularly, to a vehicle attachment to be mounted on a pick-up truck.

The most common method of transporting snowmobiles is by means of a trailer pulled by an automobile or truck, such as the trailer described in Canadian Patent 926,438, issued May 15, 1973. It is also usual to transport snowmobiles loaded on pick-up trucks. An example of a transporting attachment for pick-up trucks is the one described in Canadian Patent 911,378 issued Oct. 3, 1972. Other trailer-loading devices are also described in the literature, such as that shown in U.S. Pat. No. 4,470,746, issued Sep. 11, 1984. Each of the known methods of transporting snowmobiles presents some difficulties in unloading the snowmobile. Thus, each of the designs shown in the prior art is arranged such that the snowmobile can be removed from the transporting vehicle only by backing it down a ramp. However, many snowmobiles are made without a reverse gear and for general use in snow, a reverse gear is simply not used because it causes the back ends of the skis to dig into the snow. Thus the only reason for installing a reverse gear is for backing a snowmobile down a ramp.

Modern snowmobiles have become very sophisticated and quite heavy, weighing as much as 500 lbs or more. A reverse gear not only adds further to this weight but also adds a considerable further Cost of up to $1,500.00.

It is the object of the present invention to provide a simple system for unloading a snowmobile from a vehicle without the need for a reverse gear.

SUMMARY OF THE INVENTION

The present invention in its broadest aspect relates to a snowmobile transporting attachment for the load compartment of a pick-up truck. It comprises (a) a lower support frame adapted to be mounted in the load compartment of a pick-up truck, (b) an upper support frame mounted on said lower support frame and adapted for longitudinal backward and forward movement on said lower frame, (c) a snowmobile carrying platform pivotally mounted on said upper support frame, said pivotal mounting comprising a central pivot connecting the platform to the upper support frame, an annular track fixed to the bottom of said platform and a plurality of rollers mounted on said upper support frame and engaging said annular track and (d) detachable ramp means for connecting to either a front end or a rear end of said platform, whereby the upper support frame and platform can be moved forward and backward while mounted in a truck and said platform can also be rotated relative to the upper support frame such that a snowmobile can be both loaded and unloaded via the ramp without moving in reverse.

The upper support frame is preferably mounted on wheels with ball bearings, with the wheels travelling on tracks on the lower support frame. The rollers on which the annular track travels are also preferably mounted with ball bearings for ease of rotation.

Although less desirable, it is also possible to reverse the arrangement of the annular track and rollers with the rollers being mounted on the bottom of support platform and the annular track being fixed on the upper support frame.

The idea behind the arrangement of this invention is to make it a very simple matter for one person to unload a heavy snowmobile without the need for a reverse gear on the snowmobile. Thus, by having the combination of the tracks for moving the support frame backwards and forwards and a pivotal arrangement for the snowmobile carrying platform, the snowmobile can easily be unloaded without a reverse gear simply by rolling the support frame and platform back so that the platform clears the cab of the pick-up truck during rotation and then rotating the platform on the support frame through 180° so that the snowmobile now faces to the rear end rather than to the front end of the vehicle. A ramp is then connected to the carrying platform at the rear end of the vehicle and the snowmobile is then simply driven down the ramp in forward gear.

A difficulty was encountered in designing this arrangement particularly in rotating the mechanism. It is common to carry two snowmobiles on a pick-up truck and because of the weight of the snowmobiles and the platform, the rotation of the platform can become a difficult matter for one person if the rotational mechanism is not of a special design.

The rotational problems are overcome according to this invention by use of the annular track and corresponding rollers. The annular track is preferably of substantial diameter relative to the width of the truck load compartment, e.g. at least half of the total width of the load compartment, as this provides a very stable support for the loaded platform.

Because snowmobiles are typically used in extremely cold weather, as low as −35° C., it is important that any rotating mechanism be immune to problems of collecting snow, icing and extremely low temperatures. These problems are avoided by the use of the relatively narrow annular track of this invention and the rollers on which this annular track moves. With this arrangement, it has been found that one person can easily rotate with one hand a platform holding two snowmobiles.

BRIEF DESCRIPTION OF THE DRAWINGS

In the accompanying drawings which illustrate one preferred embodiment of the invention.

Figure 1:
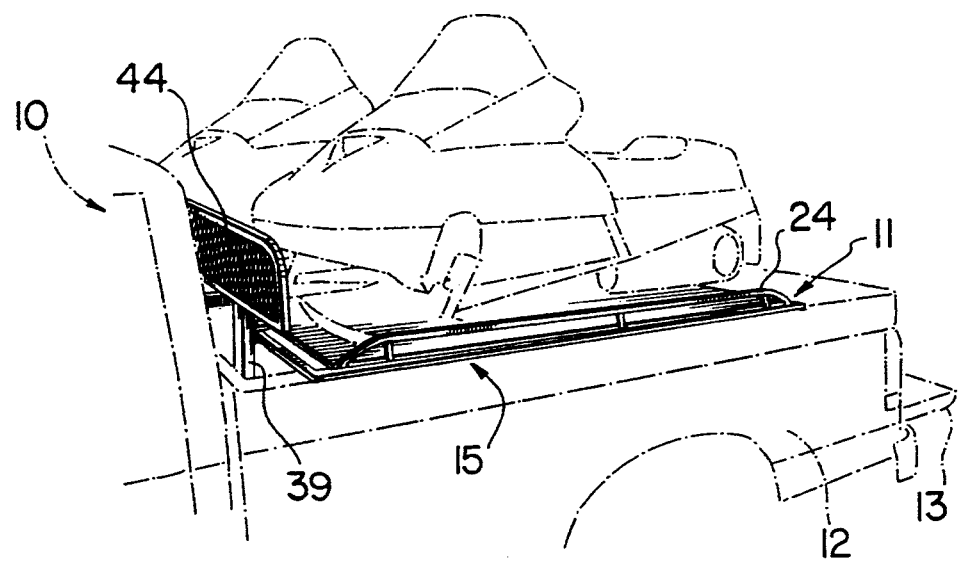
FIG. 1 is a perspective view of a truck with snowmobiles in loaded position.
Figure 2:
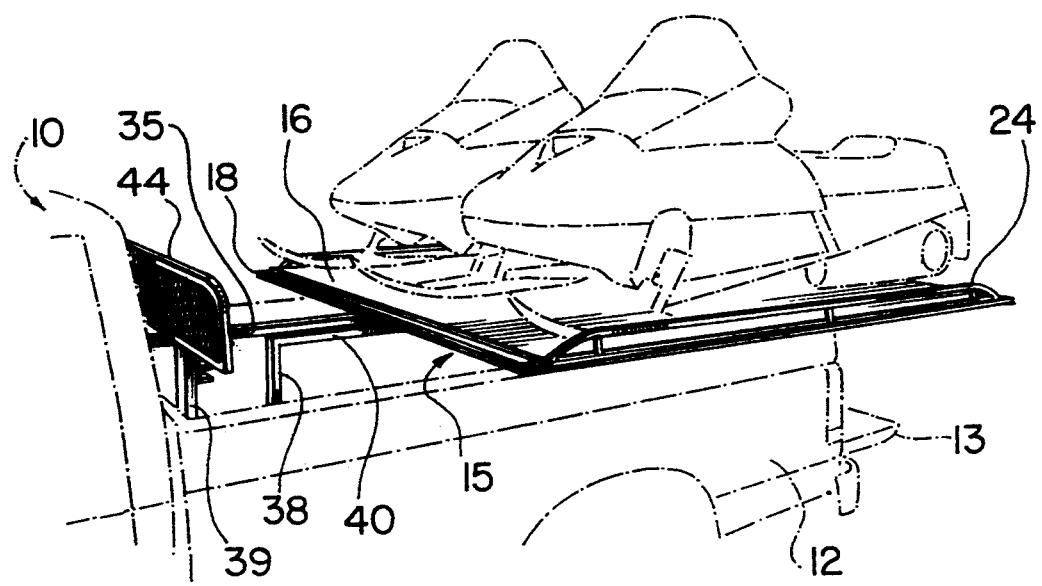
FIG. 2 is the same basic view as FIG. 1 with snowmobiles in a rolled back position.

As shown in the drawings, a truck 10 has a load box 11 with side panels 12 and a tailgate 13. Mounted within the load box is a snowmobile carrying attachment details of which can best to be seen in FIGS. 5–8.

The snowmobile transporting attachment comprises a movable load platform 15 having a plywood deck portion 16 supported on a steel framework formed of 1" square tubes. The framework includes side members 17, outer end members 18, inner end members 19, a pair of central cross members 20 and angle braces 21. These parts are all welded together with a space between members 18 and 19. Welded to the bottom of the framework is a circular track 22 again formed of a square tubular steel member. At the center of platform 15 is a pivot plate 23.

Figure 5:
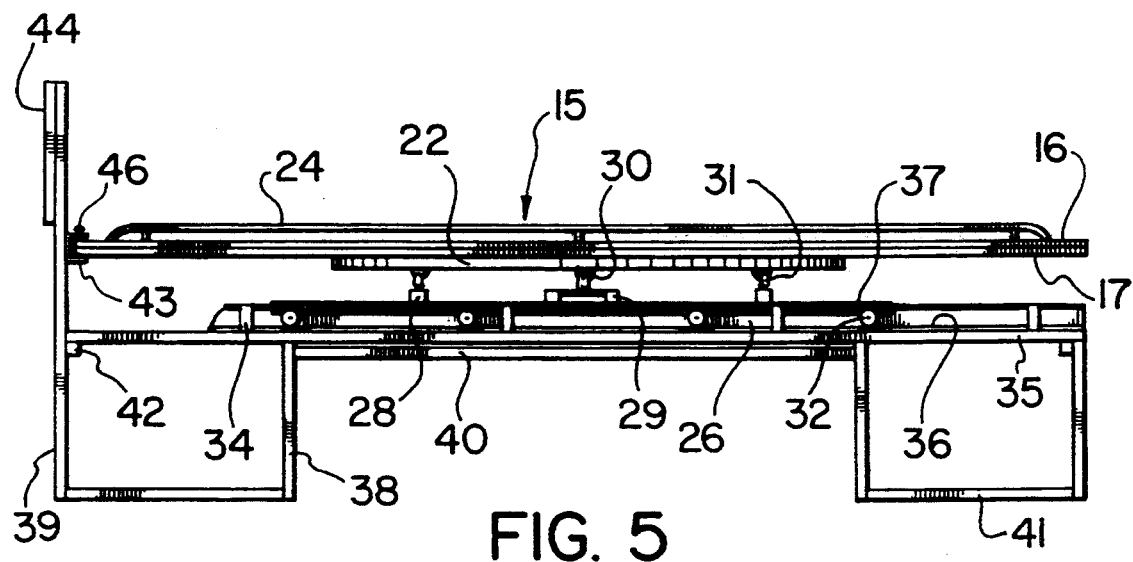
FIG. 5 is a side elevation of the mechanism of the invention.
Figure 6:
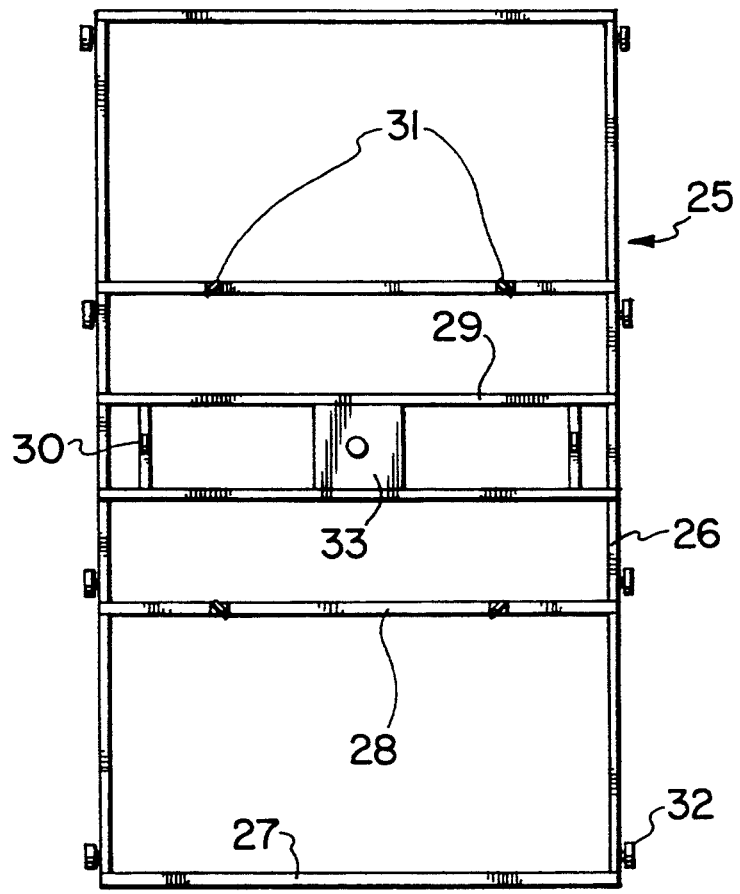
FIG. 6 is a plan view of a roll back carriage.
Figure 7:
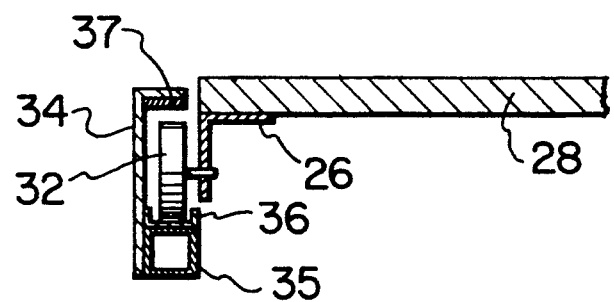
FIG. 7 is a partial sectional view of a carriage roller assembly.
Figure 8:
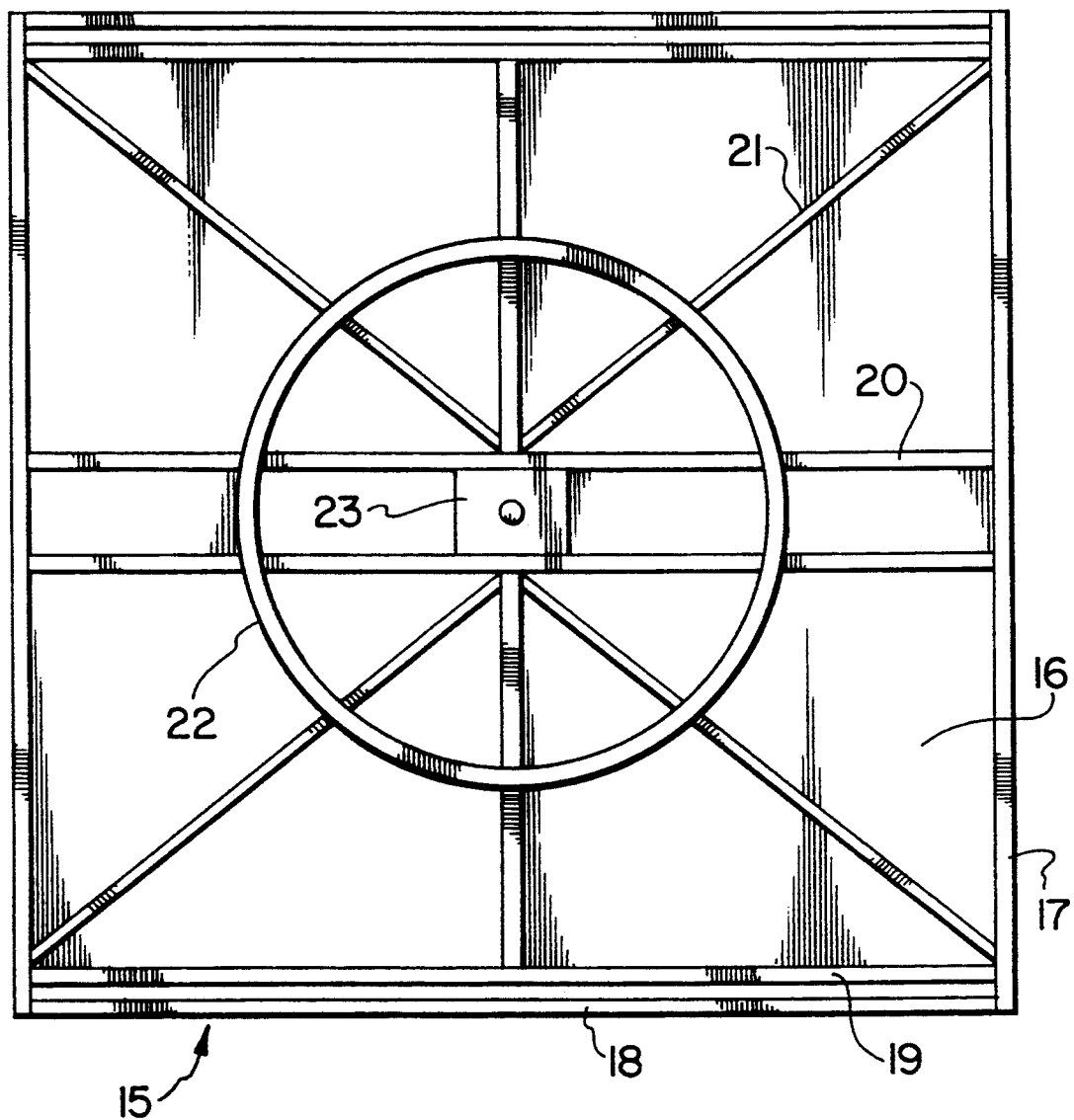
FIG. 8 is a bottom plan view of a snowmobile carrying platform.

The platform 15 is carried by a movable frame 25 which can be seen in FIGS. 5-7. This frame 25 includes a pair of side angle members 26 held by transverse square tube members. These transverse members include end members 27, intermediate members 28 and a pair of central members 29. These are all welded to the side members 26. A pair of rollers 31 is mounted to each intermediate transverse member 28 and two further rollers 31 are mounted on short support pieces 30 between transverse members 29. Wheels 32 with ball bearings are mounted on the outer faces of the angle members 26 and a pivot plate 33 is mounted centrally between the central transverse members 29. A pivot pin (not shown) connects the pivot plates 23 and 33 whereby the platform 15 can be rotated on the frame 25 around the pivot with the circular track 22 travelling on the rollers 31. These rollers 31 are mounted with ball bearings for ease of operation.

The movable frame 25 is in turn mounted on a fixed support frame which sits within the load box 11 of the truck 10. This frame can best be seen from FIG. 5 and includes a pair of laterally spaced longitudinal square tube members 35 with track members 36 mounted thereon. The wheels 32 of frame 25 travel on the tracks 36 and the frame 25 is prevented from tilting on the tracks 36 by means of a top rail 37 fixed to longitudinal members 35 by means of brackets 34. The tubes 35 are supported by short vertical tubular members 38 and longer front end vertical tubular members 39. A longitudinal reinforcing member 40 is mounted between a pair of inner vertical members 38 and beneath longitudinal member 35. The vertical members 38 and 39 are also held at the bottom ends by base members 41. The framework is also held together by cross beams 42.

The front end of the assembly includes a steel mesh guard wall 44 fixed to vertical members 39 for protecting the rear window of the truck and brackets 43 for holding platform 15 in a forward position. The front end of platform 15 can move into brackets 43 as shown in FIG. 5 and is held in place by means of pins 46.

Figure 10:
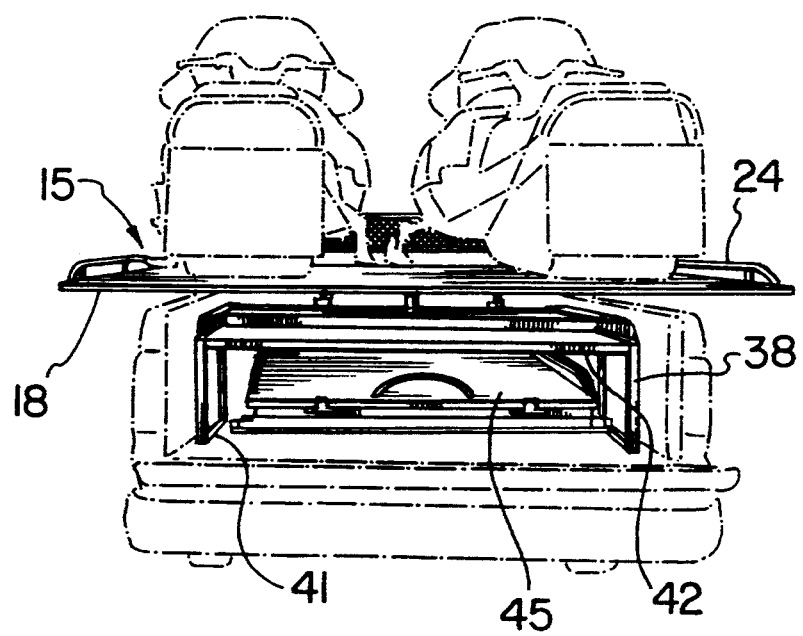
FIG. 10 is a rear perspective view of a loaded truck.

Finally, the system includes a folding ramp 45 of known design which hooks onto either end of platform 15, hooking to the outer end members 18. When the ramp 45 is not in use, it is folded and pushed into the load box of the truck beneath the snowmobile support system as shown in FIG. 10.

Figure 3:
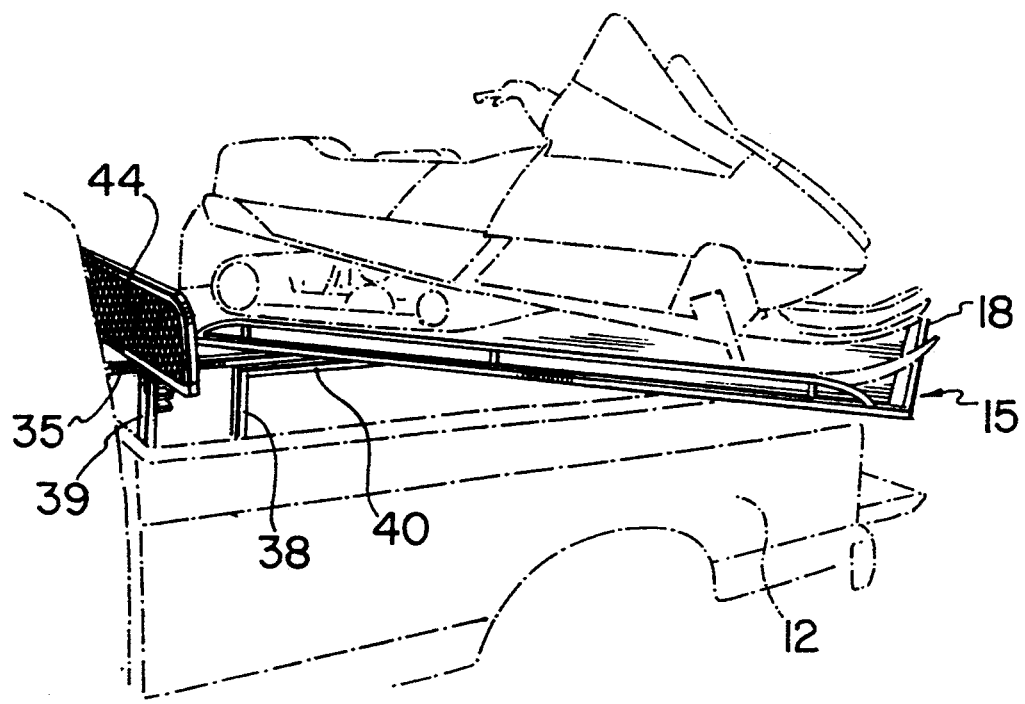
FIG. 3 is the same basic view as FIG. 2 with the snowmobiles being rotated.

In operation, as shown in FIG. 1, the system is in the location shown in FIG. 5 with the platform 15 locked in the forward position within the bracket 43. The pin 46 is removed from the bracket 43 and the entire upper platform 15 is then easily rolled backwards within the truck box by means of the wheels 32 and tracks 36 and this can easily be done by one person. In the rolled-back position where the turning radius of the platform will clear the cab of the truck, the platform 15 is then rotated by means of the central pivot, rollers 31 and track 22 as shown in FIG. 3 until it reaches the position as shown in FIG. 4 with the platform and snowmobiles completely reversed from the position shown in FIG. 1.

Figure 4:
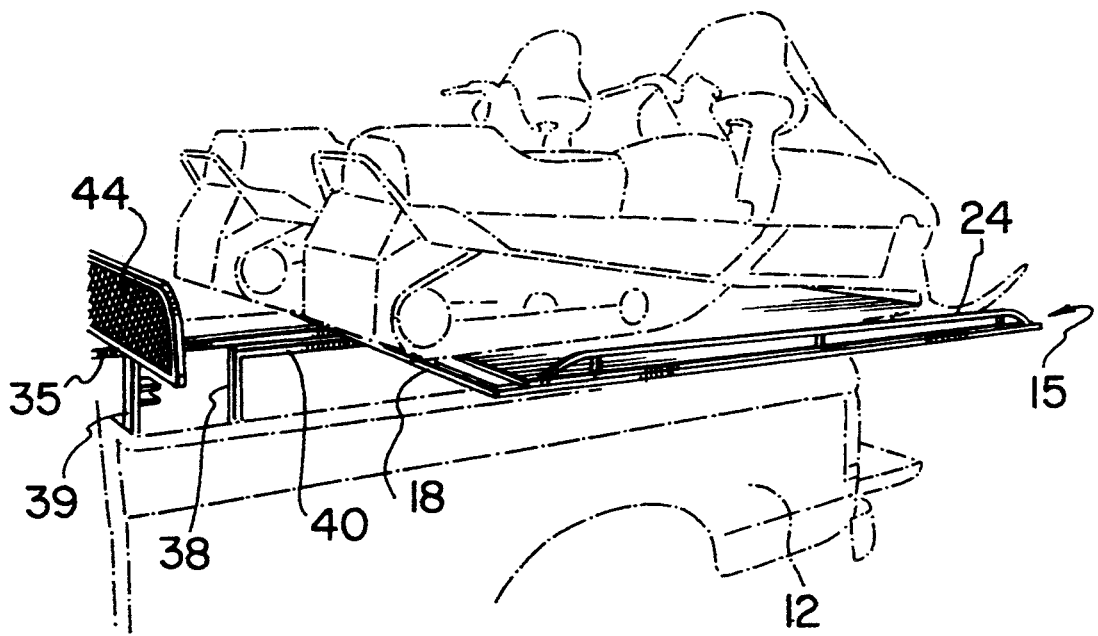
FIG. 4 is the same basic view as FIG. 2 with the snowmobiles rotated 180°.
Figure 9:
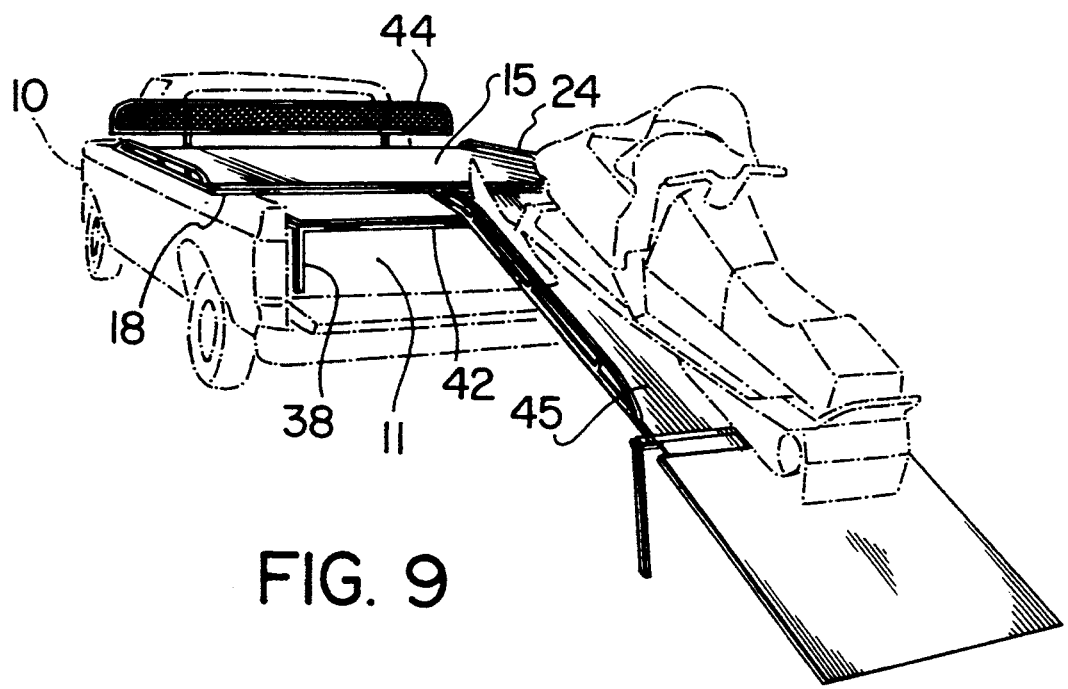
FIG. 9 is a rear perspective view showing a snowmobile being loaded.

In the position as shown in FIG. 4, the ramp 45 is mounted to the platform as shown in FIG. 9 and the snowmobiles are driven off the truck.

When it is time to reload the truck, it is simply a matter of driving the snowmobiles up the ramp 45 onto the truck as shown in FIG. 9 with the platform 15 locked in forward position. When the snowmobiles have been loaded, the folding ramp 45 is folded and stowed in the truck box as shown in FIG. 10.

With the unique design of this invention, it is an easy matter for one person to load and unload a pair of snowmobiles on the back end of a pick-up truck without any requirement for a reverse gear in the snowmobiles.

The present invention is, of course, in no way restricted to the specific disclosure of the specification and drawings, but also encompasses any modification within the scope of the appended claims.

I claim:

1. A snowmobile transporting attachment for the load compartment of a pick-up truck comprising:
   (a) a lower support frame having longitudinal tracks fixed thereto, said lower support frame adapted to be mounted in the load compartment of a pick-up truck,
   (b) an upper support frame having wheels mounted thereon, said upper support frame mounted on said lower support frame and adapted for longitudinal backward and forward movement thereon by means of said wheels and said longitudinal tracks said tracks including guide rails fixed above the wheels to prevent tiling of the upper frame on the lower frame,
   (c) a snowmobile carrying platform pivotally mounted on said upper support frame, said pivotal mounting comprising a central pivot connecting the platform to the upper support frame, a circular track formed of a square tubular member fixed to the bottom of said platform and a plurality of rollers mounted on said upper support frame and engaging a face of said square tubular circular track and
   (d) detachable ramp means for connecting to either a front end or a rear end of said platform,
   whereby the upper support frame and platform can be moved forward and backward while mounted in a truck and said platform can also be rotated relative to the upper support frame such that a snowmobile can be both loaded and unloaded via the ramp without moving the snowmobile in reverse.

2. A snowmobile transporting attachment as claimed in claim 1 wherein said annular track has a diameter at least half of the total width of the support platform.

3. A snowmobile transporting attachment as claimed in claim 2 wherein the annular track travels on at least six rollers.

* * * * *